July 18, 1944. C. L. DEWEY 2,353,712
BICYCLE FRAME
Filed July 16, 1942
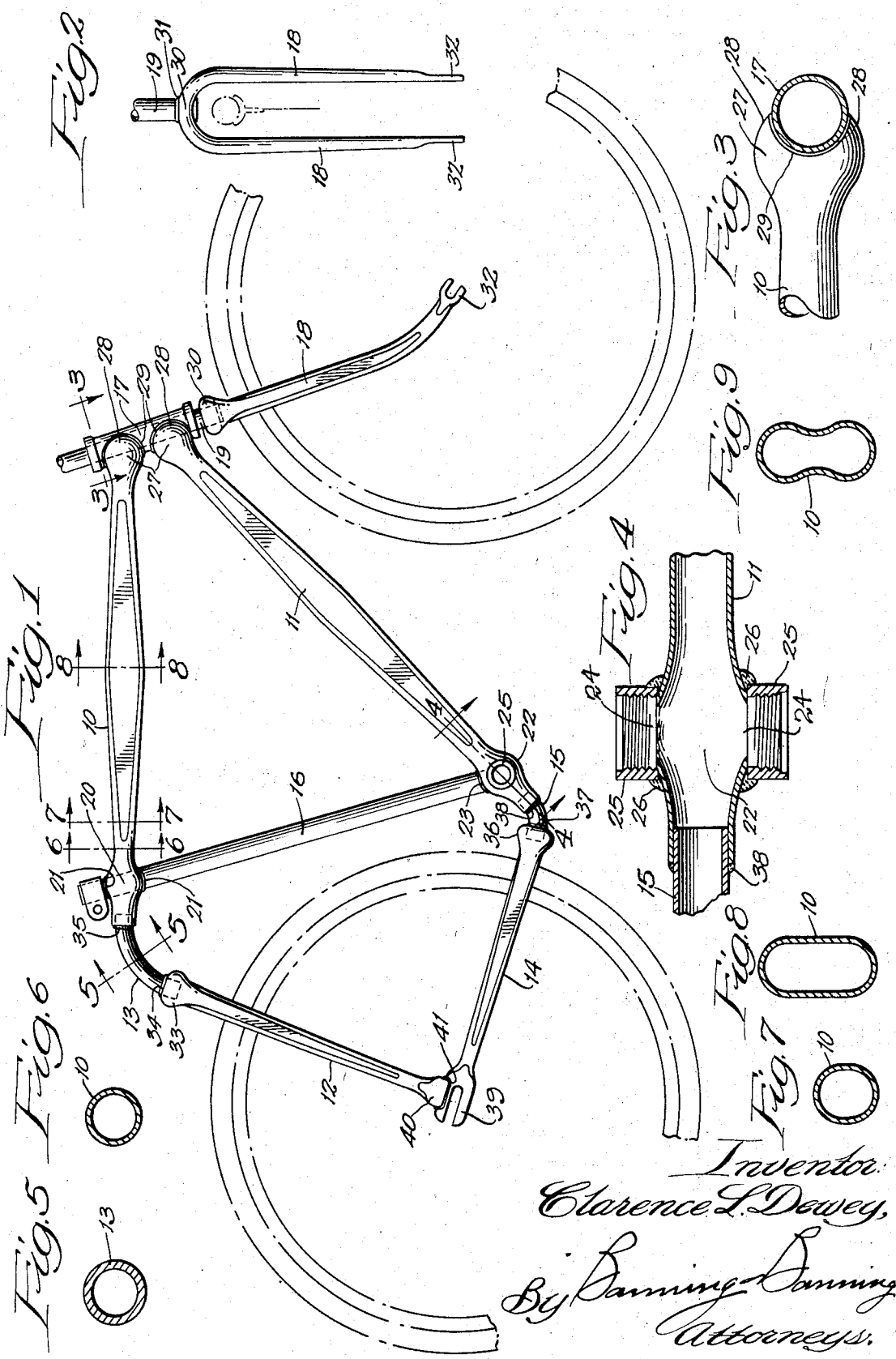
Inventor
Clarence L. Dewey,
By Banning Banning
Attorneys.

Patented July 18, 1944

2,353,712

UNITED STATES PATENT OFFICE 2,353,712

BICYCLE FRAME

Clarence L. Dewey, Elkhart, Ind.

Application July 16, 1942, Serial No. 451,157

9 Claims. (Cl. 280—281)

The bicycle frame of the present invention is designed with a view of employing in its construction tubular frame elements tapered and otherwise configured in accordance with the method set forth and described in the Dewey patent, No. 2,265,723, issued December 9, 1941, with such additional deformation in the walls of the tubing as may be necessary to afford the special end forms which are required in uniting the elements of the frame into a rigid construction.

With this end in view, the front fork which supports the steering wheel, and the two rear forks which embrace the rear driving wheel are each bent from tubing initially configured to the required shape to permit the same to be bent into arch formation required in the completed fork, and are assembled and connected with additional sections of tubing initially configured by the Dewey process to give the taper required in the completed frame.

With the frame elements thus constructed, it is possible to run an extended length of tubing through the machine of the Dewey process and to give it the required configuration throughout to enable it to be cut up into sections each of a length to be thereafter fabricated into a bicycle frame fork, and to likewise configure the truss elements as units in an extended section of tubing and thereafter fabricate the same into the form required in building up the structure of the frame.

Further details will appear from a description of the invention in conjunction with the accompanying drawing wherein Figure 1 is a side elevation of the complete bicycle frame; Fig. 2 a front elevation of the steering fork; Fig. 3 a fragmental view partly in cross section taken on line 3—3 of Fig. 1; Fig. 4 a fragmental sectional view taken on line 4—4 of Fig. 1; Figs. 5, 6, 7 and 8 cross-sectional views taken on lines 5, 6, 7, and 8 of Fig. 1; and Fig. 9 a modification of the cross section of Fig. 8.

The bicycle frame as a whole is of the usual truss formation comprising an upper horizontal truss member 10, a lower oblique truss member 11, a rear upper fork 12, connected with the upper truss member by an arch connection 13, a lower rear fork 14, connected with the lower end of the lower truss member by an inverted arch connection 15, a strut 16, a steering post sleeve 17, and a front fork 18 carried by the steering post 19.

The principal parts are formed from metal tubing and tapered from the center toward the ends to more advantageously distribute the metal to secure the required strength with a minimum weight of metal.

The upper truss member near its rear end has the tube wall outwardly displaced to afford a spherical bulge 20 through which the tubular strut 16 extends being connected thereto by a ring of arc welding, oxygen gas welding or brazing 21 at the points where the strut passes through the upper and lower portions of the bulge, and wherein I employ the term "welding" it will be understood to include any of the connections mentioned above or any equivalent thereof.

The lower end of the strut is entered into an aperture formed in a similar spherical bulge 22 formed near the tapered and reduced lower end of the truss member 11. The lower end of the strut is entered only through an aperture in the upper side of the bulge and united thereto by a welding ring 23. The sides of the bulge 22 are cut through to afford aligned apertures 24 for the reception of the usual crank shaft and bearings not shown, and the side walls of the bulge adjacent the apertures have abutted thereon the edges of oppositely disposed bearing collars 25 which are secured thereto by a ring of welding 26.

The forward ends of the upper and lower truss members converge toward one another and each terminates in a spherical bulge 27 which on its forward side 28 is curvedly channelled to embrace the steering post sleeve 17 which extends through both channels and is welded to the ends of the upper and lower truss members by lines of welding 29.

The lower end of the steering post 19 is entered through the upper arch section 30 of the steering fork. This arch section is formed from tubing which is oppositely tapered from a central bulge which is thereafter flattened in the vertical dimension and correspondingly spread or widened in the longitudinal dimension to give the configuration shown. The steering post is entered through apertures in the upper and lower wall portions of the arch and united thereto by rings of welding 31 which afford a firm and rigid connection.

In order to improve the appearance of the bicycle, the side faces of the arms of the fork are flattened inwardly which affords a panel effect and at the same time gives an eliptical cross sectional configuration to the arms as will be apparent by comparison of the face dimension shown in Fig. 1 with the edge dimensions shown in Fig. 2. The same practice is observed in flattening or paneling the faces of the upper and lower truss members 10 and 11 as will be apparent from the cross sectional views illustrated in Figs. 6, 7 and 8 from which it will appear that in every case the eliptical flattening portion is more pronounced in the center of the tubing and that it progressively merges into the original circular form toward the ends of the tubing. The same practice is also observed in the rear forks which are similar in construction to the front fork previously described. This flattening of the upper and lower truss members 10 and 11 also seems to form a stronger tubular member by increasing the depth of the beam thus formed at its central or middle portion as shown in Figs. 8 and 9.

The metal walls of the tubing at the lower ends 18 of the front fork are crushed together to afford a bifurcated end 32 which carries the axle of the front wheel. The rear upper fork 12 like the front fork is in the form of an arch 33 with the tubing flattened to spread the tube walls in a fore and aft direction and to reduce the spread between the walls in a vertical direction and through the upper and lower walls of the arch is entered the lower end of an arcuate connecting section 13 which is united to the arch by ring welding 34. The opposite end of the connection is entered into the rear end of the upper truss member 10 which is circular at this point and is held therein by ring welding 35. The lower fork 14 is similarly provided with an arch 36 which receives the rear end of the connecting section 15 which is united by ring welding 37 while the forward end of the connection 15 is entered into the rear end of the lower truss member 11 and secured therein by ring welding 38.

The same tapering process is employed for configuring the tapered arms of the upper and lower rear forks. The lower rear fork has the walls of the tubing of each of its arms flattened together and widened to afford at the end of each arm a bifurcated head 39 while the lower end 40 of each tapered arm of the rear upper fork 12 is widened and flattened inwardly and grooved along its edge to straddle the upper edge of the bifurcated head 39 to which it is secured by welding 41.

In Fig. 9 I have shown a centrally grooved or channelled panel effect in cross section for the upper and lower truss member in lieu of the flattened panel of Fig. 8 but it will be understood that the flattening or paneling of the tube may be varied in some degree to afford the desired appearance although it is preferred in all cases to flatten down the sides of the several frame members to bring the major axis of the elipse thus formed into the most advantageous relation to the stresses and to provide strength for the required connections. It will thus be noted that in the upper and lower truss members 10 and 11, the maximum cross dimension extends vertically or nearly so through the center of the truss element and that in the arches of the forks the major diameter in each case extends in the proper direction to afford a wide base with abundant stock surrounding the apertures which are formed through the spaced walls of the arch to receive the element to which the arch is connected. At no point, therefore, will the metal be cut through to a degree sufficient to impair the strength of the connection or to a degree inadequate to resist the stresses imposed upon it.

The spherical bulges are formed in the initial configuring of the tubing by the Dewey process of the patent first referred to so that the tubing thus configured need merely be cut to the required lengths to provide the various structural elements and bored or otherwise configured to embrace the parts to be fitted thereto and the same thing is true of the tube sections intended to afford the tip ends of the forks which are configured to the required diameter to provide for flattening to the dimensions ultimately required in the assembling and welding of the parts.

It will thus be seen that by giving to the tubing an initial configuration properly computed to afford the ultimate dimensions when properly fabricated, the additional effort required in fabricating and fitting the parts together is reduced to a minimum and at the same time the resulting structure will properly distribute a minimum weight of metal in such a way as to afford adequate strength in every portion of the completed frame structure.

I claim:

1. In bicycle frame construction, a truss member formed of a section of tubing tapered toward each end from the center and having its sides depressed inwardly to give to the medial portion of the truss a substantially eliptical formation, the truss member at its forward end being provided with a substantially spherical bulge channelled therethrough to afford embracing engagement with an angularly extending tubular member and having near its rear end a substantially spherical bulge provided with an aperture adapted to receive a strut member.

2. In bicycle frame construction, a truss member formed of a section of tubing tapered toward each end from the center and having its sides depressed inwardly to give to the medial portion of the truss a substantially eliptical formation, the truss member at its forward end being provided with a substantially spherical bulge channelled therethrough to afford embracing engagement with an angularly extending tubular member and having near its rear end a substantially spherical bulge provided with an aperture adapted to receive a strut member, the truss member being extended beyond the rear bulge to afford in its end a socket adapted to receive a connecting member.

3. In bicycle frame construction, a lower truss member formed of tubular metal and tapered rearwardly from its medial region and provided near its rear end with a substantially cylindrical bulge in its walls, the upper wall of the bulge being adapted to receive the lower end of a strut member and the side walls of the bulge being apertured, each aperture being surrounded by a crank collar having its inner end abutted against the wall of the bulge and secured thereto by a ring of ring welding.

4. In bicycle frame construction, a lower truss member formed of tubular metal and tapered rearwardly from its medial region and provided near its rear end with a substantially cylindrical bulge in its walls, the upper wall of the bulge being adapted to receive the lower end of a strut member and the side walls of the bulge being apertured, each aperture being surrounded by a crank collar having its inner end abutted against the wall of the bulge and secured thereto by a ring of welding, and the rear end of the truss member being extended and reduced in diameter beyond the bulge to afford a substantially cylindrical socket recess to afford connection for the forward end of a connecting member.

5. In bicycle frame construction, the combination of a steering fork, a steering post rigidly secured to the fork, a sleeve surrounding the steering post above the fork, upper and lower truss members of substantial depth adjacent their longitudinal centers and tapering toward said sleeve, said truss members each terminating at its forward end in a spherical bulge, said bulges being channeled at their forward ends in conformity with and snugly embracing the outer wall of said sleeve and rigidly secured thereto, the channeled portions of said budges engaging the sleeve throughout a substantial vertical extent thereby providing a dependable connection between the tapered truss members and sleeve.

6. In bicycle frame construction, the combination of upper and lower tapered tubular truss members each provided with an enlargement in the form of a curvedly walled bulge inwardly spaced from the rear end thereby, a strut member extending through the upper and lower walls of the bulge in the upper truss member and extending through the upper walls of the bulge in the lower truss member, the parts being rigidly secured together by welding, and a wheel carrying member rigidly connected to said ends of the truss members.

7. In bicycle frame construction, the combination of upper and lower tubular truss members tapered toward their rear ends and each provided with an enlargement in the form of a curvedly walled bulge inwardly spaced from the rear end thereof, a strut member extending through the upper and lower walls of the bulge in the upper truss member and extending through the upper wall of the bulge in the lower truss member, the parts being rigidly secured together by welding, a wheel carrying member rigidly connected to said ends of the truss members, the side walls of the bulge in the lower truss member having apertured and crank shaft bearing collars fitted to the side walls of the bulge and surrounding the respective apertures and secured in place by welding.

8. In a bicycle frame construction including fork members each formed of metallic tubing, the walls of the tubing in its medial region being outwardly bulged and bent to arch formation and oppositely tapered therefrom toward the ends thereof, and a connecting frame member entered through the bulged portion of the tubing and rigidly secured thereto by welding.

9. In a bicycle frame construction or the like, the combination of upper and lower fork members each formed of metallic tubing having the walls in its medial region outwardly bulged and bent to arch formation and each fork having its arms tapered therefrom toward the ends, a connecting member entered through each of the bulged portions of the tubing and rigidly secured thereto by ring welding, the ends of the arms of the lower fork being flattened and widened and the tips of the arms of the upper fork being flattened and widened and curved to respectively straddle the upper edges of the tips of the lower fork and secured thereto by welding.

CLARENCE L. DEWEY.